(12) United States Patent
Smith

(10) Patent No.: US 9,922,350 B2
(45) Date of Patent: Mar. 20, 2018

(54) DYNAMICALLY ADAPTABLE REAL-TIME CUSTOMER EXPERIENCE MANAGER AND/OR ASSOCIATED METHOD

(71) Applicant: Software AG, Darmstadt (DE)

(72) Inventor: Gareth Smith, Waterbeach (GB)

(73) Assignee: SOFTWARE AG, Darmstadt (DE)

( * ) Notice: Subject to any disclaimer, the term of this patent is extended or adjusted under 35 U.S.C. 154(b) by 28 days.

(21) Appl. No.: 14/332,421

(22) Filed: Jul. 16, 2014

(65) Prior Publication Data

US 2016/0019608 A1     Jan. 21, 2016

(51) Int. Cl.
*G06F 15/16* (2006.01)
*G06Q 30/02* (2012.01)
*G06F 3/06* (2006.01)

(52) U.S. Cl.
CPC ....... *G06Q 30/0281* (2013.01); *G06F 3/0611* (2013.01); *G06F 3/0616* (2013.01)

(58) Field of Classification Search
CPC .... G06F 17/30545; H04M 2203/4509; H04M 3/53
USPC .................................................. 709/206–245
See application file for complete search history.

(56) References Cited

U.S. PATENT DOCUMENTS

| | | | |
|---|---|---|---|
| 5,925,108 A * | 7/1999 | Johnson | G06F 15/17 718/1 |
| 6,367,034 B1 | 4/2002 | Novik et al. | |
| 6,438,618 B1 | 8/2002 | Lortz et al. | |
| 6,480,826 B2 | 11/2002 | Pertrushin | |
| 7,426,736 B2 | 9/2008 | Cole et al. | |

(Continued)

FOREIGN PATENT DOCUMENTS

| | | |
|---|---|---|
| EP | 1 355 232 | 10/2003 |
| WO | 2013/118141 | 8/2013 |

OTHER PUBLICATIONS

Nice.com—Proactive Security, Situation Management and IP-Based Surveillance, dated Oct. 14, 2014, 1 page. http://www.nice.com/transportation/airports.

(Continued)

*Primary Examiner* — David Lazaro
*Assistant Examiner* — Berhanu Shitayewoldetadik
(74) *Attorney, Agent, or Firm* — Nixon & Vanderhye PC

(57) ABSTRACT

Certain example embodiments relate to a dynamically adaptable real-time customer experience manager and/or associated method. Electronic messages are received from different source systems. Each message has an associated message type. Metadata is dynamically and programmatically developed for each received message based on an extensible set of scoring scenarios. The metadata includes at least one metric that is comparable across messages of different types for assessing relative priorities. A determination is made as to where in a queue of pending messages each received message is to be inserted, based on the metadata. A complex event processing query is executed on the queue to dynamically identify a pending message therein that is to be delivered. The identified pending message is subjected to pre-programmed distribution scenarios to identify which possible communication channel(s) that identified pending message is to be sent. The identified pending message is forwarded to the identified communication channel(s) for sending.

30 Claims, 6 Drawing Sheets

(56) References Cited

U.S. PATENT DOCUMENTS

| | | | |
|---|---|---|---|
| 8,095,613 B1* | 1/2012 | Perkowitz | G06Q 10/109 |
| | | | 709/206 |
| 8,214,308 B2* | 7/2012 | Chu | G06N 99/005 |
| | | | 706/12 |
| 8,484,472 B2 | 7/2013 | Sherkin et al. | |
| 8,554,457 B2 | 10/2013 | White et al. | |
| 8,635,105 B2 | 1/2014 | Pradeep | |
| 8,683,348 B1 | 3/2014 | Blank | |
| 8,939,903 B2 | 1/2015 | Roberts | |
| 8,977,573 B2 | 3/2015 | Daya | |
| 2002/0026484 A1* | 2/2002 | Smith | H04L 51/28 |
| | | | 709/206 |
| 2002/0120559 A1* | 8/2002 | O'Mara | G06Q 40/00 |
| | | | 705/38 |
| 2002/0161604 A1* | 10/2002 | Kardos | G06Q 10/06 |
| | | | 705/1.1 |
| 2003/0103501 A1* | 6/2003 | Clem | H04L 12/6418 |
| | | | 370/389 |
| 2003/0118974 A1 | 6/2003 | Obrador | |
| 2003/0135575 A1* | 7/2003 | Marejka | H04L 43/00 |
| | | | 709/207 |
| 2003/0140139 A1* | 7/2003 | Marejka | H04L 43/14 |
| | | | 709/224 |
| 2004/0001616 A1 | 1/2004 | Gutta | |
| 2004/0210159 A1 | 10/2004 | Kibar | |
| 2005/0096958 A1 | 5/2005 | Rice | |
| 2005/0183143 A1 | 8/2005 | Anderholm | |
| 2006/0064464 A1* | 3/2006 | Kakivaya | H04L 1/1848 |
| | | | 709/206 |
| 2006/0215023 A1 | 9/2006 | Coonce | |
| 2007/0033050 A1 | 2/2007 | Asano | |
| 2007/0118545 A1 | 5/2007 | Chandrasekharan et al. | |
| 2008/0040110 A1 | 2/2008 | Pereg | |
| 2008/0062881 A1* | 3/2008 | Martin | H04L 12/5692 |
| | | | 370/238 |
| 2008/0098406 A1* | 4/2008 | Quick | G06Q 10/107 |
| | | | 719/314 |
| 2008/0109824 A1* | 5/2008 | Chen | G06F 9/542 |
| | | | 719/318 |
| 2009/0285456 A1 | 11/2009 | Moon | |
| 2010/0037187 A1 | 2/2010 | Kondziela | |
| 2010/0161362 A1 | 6/2010 | Shapira et al. | |
| 2010/0194560 A1 | 8/2010 | Hojecki et al. | |
| 2011/0091847 A1 | 4/2011 | Carroll | |
| 2011/0250972 A1 | 10/2011 | Horbay | |
| 2011/0276396 A1* | 11/2011 | Rathod | G06F 17/30867 |
| | | | 705/14.49 |
| 2012/0185877 A1 | 7/2012 | McGuire et al. | |
| 2012/0233051 A1 | 9/2012 | Sheldon | |
| 2012/0254084 A1 | 10/2012 | Richter et al. | |
| 2012/0278176 A1 | 11/2012 | Naor | |
| 2012/0331003 A1* | 12/2012 | Chu-Carroll | G06F 17/30654 |
| | | | 707/771 |
| 2013/0018702 A1 | 1/2013 | Smith et al. | |
| 2013/0191520 A1 | 7/2013 | Khouri | |
| 2013/0346067 A1 | 12/2013 | Bhatt | |
| 2014/0095150 A1 | 4/2014 | Berjikly | |
| 2014/0146683 A1* | 5/2014 | Stogner | H04W 72/1215 |
| | | | 370/241 |
| 2014/0163960 A1 | 6/2014 | Dimitriadis | |
| 2014/0257820 A1 | 9/2014 | Laperdon | |
| 2014/0324959 A1* | 10/2014 | Hudson | H04L 47/623 |
| | | | 709/203 |
| 2014/0365334 A1 | 12/2014 | Hurewitz | |
| 2015/0235655 A1 | 8/2015 | Dimitriadis | |
| 2015/0356349 A1 | 12/2015 | Govindarajeswaran | |
| 2015/0356675 A1 | 12/2015 | Schulz | |
| 2015/0379355 A1 | 12/2015 | Kanga | |
| 2016/0012530 A1 | 1/2016 | Gardner | |
| 2016/0048914 A1 | 2/2016 | Smith | |
| 2017/0046566 A1 | 2/2017 | Smith et al. | |

OTHER PUBLICATIONS

Robin Gilthorpe, "Big Fast Data World," Software AG, Innovation World, Oct. 9, 2013, pp. 1-30.

U.S. Appl. No. 14/515,663 filed Oct. 16, 2014, Gareth Smith et al.

U.S. Appl. No. 14/457,365 filed Aug. 12, 2014, Gareth Smith.

Liljana Stojanovic et al., "Real-Time Monitoring of Web-Based Processes: A Use Case for the Event-Driven Advertisement," Business Process Management Workshops, BPM 2010 Workshops and Education Track, Hoboken, NJ, Copyright 2011, pp. 719-729.

Griffiths, Sarah, "Cars could soon monitor our Emotions: Device reads facial expressions to prevent road rage", Mar. 14, 2014, Daily Mail via dailymail.com, 6 pages.

Fenton-O'Creevy, Mark et al., "Emotion Regulation and Trader Performance", May 2011, presented at 15th conference of the European Association of Work and Organizational Psychology, Maastricht, The Netherlands, 16 pages.

Fenton-O'Creevy, Mark et al., "Thinking, feeling and deciding: The influence of emotions on the decision making and performance of traders", Published online Jul. 26, 2010 in Wiley Online Library, Journal of Organizational Behavior, J. Organiz. Behav. 32, 1044-1061 (2011), 18 pages.

Lo, Andrew W. et al., "The Psychophysiology of Real-Time Financial Risk Processing", Copyright 2001, NBER Working Paper Series: Working Paper 8505, 34 pages.

* cited by examiner

DYNAMICALLY ADAPTABLE REAL-TIME CUSTOMER EXPERIENCE MANAGER AND/OR ASSOCIATED METHOD

TECHNICAL FIELD

Certain example embodiments described herein relate to a dynamically adaptable real-time customer experience manager and/or associated method. Certain example embodiments advantageously improve the ways in which organizations interact with customers, e.g., by (a) dynamically and programmatically rating incoming messages of a plurality of different formats received from a plurality of message sources, (b) queuing rated messages for delivery using a complex event processing (CEP) engine or the like, and (c) distributing the queued messages at appropriately determined times and via appropriately determined channels, while complying with overall message delivery management policies.

BACKGROUND AND SUMMARY OF EXAMPLE EMBODIMENTS

Organizations seek to communicate with information consumers in a wide variety of ways, e.g., to provide general-interest or organization-specific alerts such as, for example, weather reports, emergency road closures, breaking news stories, suspected account fraud, etc. Similarly, organizations might also try to present to potential customers special offers on goods and/or services, etc.

Messages may be delivered through a number of different channels, ranging from traditional "snail-mail" or posted mail, to telephone calls, to the seemingly more ubiquitous email. Other messages are delivered through standards-based services such as SMS or MMS services, while still other messages are delivered through proprietary services such as the Apple Push Notification service (which is a service Apple uses to push notifications to Apple iOS devices) or the like. Some organizations reach out to customers by providing information through, and/or soliciting information via, websites, etc.

As people stay more connected through the widespread adoption of smart devices and the like, it seems that both the number of messages and the ways in which such messages can be delivered has increased.

Another interesting trend relates to messages being delivered over electronically-mediated channels and including real-time and/or time-sensitive content. Such content might be based on a variety of factors such as, for example, location and/or profile matching for real-time offers; notifications of possible fraudulent use of a credit card; offers for extended return/warranty service for recently purchased items; requests to complete surveys; etc.

Messages may be delivered at a time that is either explicitly requested by the originating system (e.g., right now, a specific time (e.g., 30 minutes before a football game), etc.), or seemingly arbitrarily (e.g., at the end of an analytics batch cycle). Unfortunately, however, these delivery timeframes tend to have no bearing on the collective impact to the end-customer. That is, given the potentially "unconnected" nature of the sources of all these messages, one organization might not know what another organization is doing, how many or what messages a customer is receiving, whether the customer is even in a position to receive messages, etc. As a result of this unconnected nature, an individual organization that sends many messages, or that has the poor fortune of wanting to send only one message to an otherwise inundated person, might negatively impact the customer experience with that particular organization. Again, this possible negative impact might have nothing to do with the direct actions of that particular organization. But such negative impacts might nonetheless "be real" and lead to unhappy customers, lower customer engagement with otherwise important messages and/or that organization as a whole, increasing churn (which refers to the inefficient and inconvenient process of switching from provider-to-provider, oftentimes in the telecommunications context), etc.

It therefore will be appreciated that it would be desirable to solve one or more of the above-described and/or other problems. For instance, it will be appreciated that it would be desirable to coordinate message delivery to provide messages to users in a more coherent manner, e.g., that takes into account factors such as, for example, when and how best to present messages to users—even though such messages potentially may come from many different originators across many different channels, and be of many different types.

Certain example embodiments collate messages from identified sources and channels and use an event-based matching engine to continuously manage the dynamic list of messages. In this way, certain example embodiments manage how and when messages are delivered to customers, e.g., so that only the most appropriate messages are passed on to the end-customers in real-time via the most appropriate channels. This technique also can be used to reduce the unsolicited contact points that an organization has with end-customers, thereby potentially improving the customer experience, increasing customer trust and loyalty, etc.

The ability to provide services on a real-time basis and in connection with real-time delivery is advantage for a number of reasons. For instance, messages themselves tend to be time-sensitive. As one example, location-based offers generally will use the location of the customer (who will normally be moving) to determine whether to send an offer. Thus, it would be desirable to make offers available to potential customers while they are at or near the correct locations, or not at all. Consider, for example, a location-based offer for a book in a series of books being read by a consumer, with that offer being redeemable at a specific store. If that customer receives the offer as the customer is passing the store, it is both relevant and has a good chance of converting an offer to a sale of the book. By contrast, if the message is received a few minutes later, the customer may have passed the store and, thus, the message is more likely to be perceived as unwanted spam, thereby creating a negatively impression of the bookstore.

Even for when messages themselves are not time sensitive (e.g., an offer to take up a loan), they oftentimes are not targeted towards a specific context (e.g., when a high value purchase is made). Thus, although a customer may eligible to be receive a loan offer at virtually any time after a qualification decision has been made, matching the sending of the message to a time when an expensive item is purchased could add value, e.g., in term of presenting the offer at a time that is appropriate and again likely to lead to the offering being seized. Receiving the message sometime before the purchase is made (and when a subsequent large purchase might not be made) or long after the purchase is made (and when another subsequent large purchase might not be made) likely will be out of context and could create a negative impression.

It thus can be seen that the message processing techniques of certain example embodiments that take into account through real-time processing time-sensitivity issues regarding the messages being sent can be advantageous in a number of different contexts. Similarly, it can be seen that certain example embodiments advantageously provide controls for customer engagement with one or more organizations, e.g., through highly-parallel and asynchronous processing of interactions between many disparate systems.

An aspect of certain example embodiments relates to the real-time and dynamic cross-correlation and orchestration of a body of messages, and the distribution of such messages across the most appropriate channels. An event-based system may be used to implement a matching engine in this regard.

Another aspect of certain example embodiments relates to a dynamic matching engine that continually reassesses messages against themselves and ever changing contexts. Certain example embodiments provide for the programmatic selection of an appropriate channel for message delivery, e.g., in connection with (for example, after) the matching engine determining that a message should be sent.

Another aspect of certain example embodiments relates to comparing normalized messages, filtering out unwanted messages, filtering in messages likely to be of interest, handling multi-channel contexts, and/or the like.

Certain example embodiments involve, among other things, Customer Relationship Management (CRM) related technologies. <ore particularly, certain example embodiments relate to, among other things, a dynamic and generic solution to taking multiple messages and activity feeds from almost any source in real-time, processing them, and delivering them to the customers again using almost any of the available delivery mechanisms that the customers use in order to enhance their experiences, e.g., by presenting those customers with relevant information at a time and in a manner likely to be of the most interest. That is, the message delivery may be adjusted to an optimized or improved time, message prioritization, and/or delivery channel, optionally based on the customer's requirements.

In certain example embodiments, there is provided a computer-mediated electronic message distribution method. Electronic messages are received from a plurality of different source systems, with each said received message having an associated message type. Metadata is dynamically and programmatically developed for each said received message based on an extensible set of scoring scenarios, with the metadata including at least one metric that is comparable across messages of different message types in assessing relative priorities of such messages, and with the extensible set of scoring scenarios being stored to a first non-transitory computer readable storage medium and being computer-executable. A determination is made as to where in a queue of pending messages each said received message is to be inserted, based on the metadata associated with the respective messages. Responsive to the determining, each said received message is inserted into the queue of pending messages. A complex event processing (CEP) query is executed on the queue of pending messages to dynamically identify a pending message therein that is to be delivered, in connection with at least one processor. The identified pending message that is to be delivered is subjected to a plurality of pre-programmed distribution scenarios to identify which of a plurality of possible communication channels that identified pending message is to be sent, with the pre-programmed distribution scenarios being stored to a second non-transitory computer readable storage medium and being computer-executable. The identified pending message is forwarded on to the identified communication channel(s) for sending.

In certain example embodiments, a message manager computer system is provided. The system includes processing resources including at least one processor, and a plurality of computer-mediated interfaces to respective electronic message source systems over which electronic messages are receivable. The processing resources are configured to cooperate with the plurality of interfaces and control the message manager computer system to at least: receive electronic messages from ones of the electronic message source systems, each said received message having an associated message type; dynamically and programmatically develop metadata for each said received message based on an extensible set of scoring scenarios, the metadata including at least one metric that is comparable across messages of different message types in assessing relative priorities of such messages, the extensible set of scoring scenarios being stored to a first non-transitory computer readable storage medium of the message manager computer system and being computer-executable; determine where in a queue of pending messages each said received message is to be inserted, based on the metadata associated with the respective messages; responsive to the determining, insert each said received message into the queue of pending messages; dynamically identify a pending message in the queue of pending messages that is to be delivered; subject the identified pending message that is to be delivered to a plurality of pre-programmed distribution scenarios to identify which of a plurality of possible communication channels that identified pending message is to be sent, the pre-programmed distribution scenarios being stored to a second non-transitory computer readable storage medium of the message manager computer system and being computer-executable; and forward on the identified pending message to the identified communication channel(s) for sending.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS

An organization with multiple customers oftentimes will implement multiple possible communication channels through which they communicate a range of different messages. As explained above, however, an organization may put the customer experience at risk in foreseeable and/or unforeseeable ways, as there generally is no consideration for, or control over, the actually delivered experience (e.g., as impacted by message delivery, uncoordinated interaction with other systems, changing customer contexts, etc.). Even if the underlying systems with which a particular customer interacts each is limited to one message per day, it is still possible that with ten independent systems any one user will receive ten messages within one minute across any set of channels. Such experiences can be confusing, overwhelming, and/or have other negative effects on the customers which, in turn, can lead to negative sentiments across social media, degradation of brand value, loss of customers, etc.

In order to consider and improve upon the experience of end-customers, certain example embodiments involve a dynamically adaptable real-time customer experience manager and/or associated method. That is, certain example embodiments collect messages (e.g., as requested by the customers) and pass them through a Real-Time Customer Experience Manager, through which such messages may be delivered to end-customers though a permissible channel and at a time (possibly in the future) that is logical. Organizations may leverage the Real-Time Customer Experience Manager of certain example embodiments in order to help actively ensure that each of their customers' individual experiences are well balanced regardless of how many possible message sources (e.g., marketing campaigns, fraud alerts, website adverts, etc.) and distribution channels (e.g., on-line, smart phone messages, SMS messages, in-store welcomes, email, etc.) exist.

Figure 1:
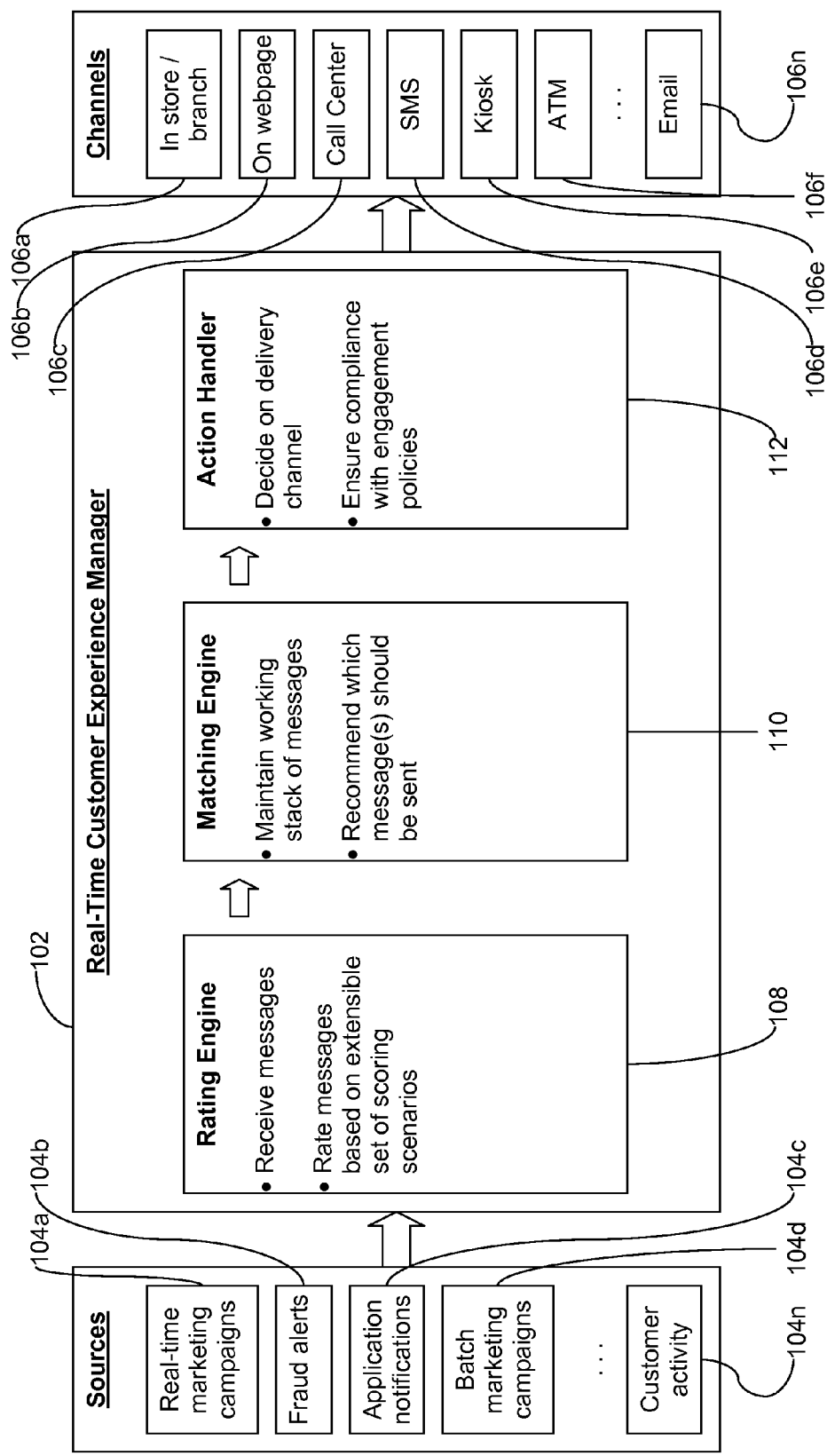
FIG. 1 is a schematic view of a Real-Time Customer Experience Manager in accordance with certain example embodiments.

FIG. 1 is a schematic view of a Real-Time Customer Experience Manager 102 in accordance with certain example embodiments. As can be seen from FIG. 1, the Real-Time Customer Experience Manager 102 of certain example embodiments is configured to receive messages of potentially different types from a plurality of different sources 104a-104n, process them, and deliver them to consumers via one or more appropriate channels 106a-106n at one or more appropriate times. It will be appreciated that the sources 104a-104n and channels 106a-106n shown in FIG. 1 are provided by way of example, and that the same and/or other sources and/or channels may be provided in different example embodiments. Additionally, although not expressly shown in FIG. 1, it will be appreciated that the sources 104a-104n shown and/or other sources may be used in connection with one or more organizations communicating with one or more customers over the channels 106a-106n shown and/or other channels. In other words, certain example embodiments may use the Manager 102 to enable communications between the organizations and customers in any suitable cardinality (e.g., one-to-one, one-to-many, many-to-many, or many-to-one) using the illustrated and/or other message types and/or using the illustrated and/or other channels.

The example Manager 102 of FIG. 1 includes a rating engine 108, a matching engine 110, and an action handler 112. Example high-level functionality of each of these components of the Manager 102 is provided in FIG. 1, and exemplary structural components that enable this example functionality are described below (e.g., in connection with a more detailed illustrative implementation). In the meantime, it is noted that the rating engine 108 receives "raw" messages from one or more source systems 104a-104n. These messages may be notifications, events, alerts, and/or other message types from the source systems 104a-104n. Thus, such messages may relate to a wide variety of possible information such as, for example, information relating to marketing campaigns, customer activity, real-time offers, fraud alerts, etc.

As will be appreciated, the messages streaming into the Manager 102 may be of many different types and may include very divergent data, e.g., as a severe weather alert would convey information that is quite different than a "flash sale" announcement. To aid in processing, the rating engine 108 will receive messages and generate set of "normalized" metadata for each incoming message. In this sense, this metadata is auxiliary data, normally associated with a message, that allows the Manager 102 to make better informed decisions concerning, for example, what a message is about; how important it is; whether, when, and how it should be delivered; etc. In certain example embodiments, this information may be attached to or otherwise associated with the messages. As will be described in greater detail below, the metadata may be generated at least in part by applying a rating algorithm to the messages. The metadata, along with the associated message, may be passed on to the matching engine 110 for further processing.

Although certain example embodiments will been described in connection with the issue of improving the customer satisfaction/customer experience from the organizational prospective, certain example embodiments may as indicated above include possible interactions from the customer side as well. For instance, the ratings engine 108 may receive customer data to filter-out and/or inclusively "filter-in" messages, specify automatic unsubscribe rules, etc. This may be accomplished, for example, by rating in connection with an extensible set of user-provided data.

For each individual customer (or user), the matching engine 110 may continually monitor their list of possible messages and any data that they opt to make available to the Manager 102. This "opt-in" data may include data associated with their message history (e.g., whether messages were sent, received, and/or read; whether message sources were subscribed to or added "out of the blue"; how long it takes from message delivery to message reading, responding, deleting, and/or other action; etc.), their activity (such as their movement, location, time zone, presence in or near a store, usage of the information in a message (e.g., redemption of a coupon, detour around a work zone, etc.) and/or the like), the passing of time, etc.

The matching engine 110 may pass the message on to the action handler 112, delete the message if it deems it no longer suitable, and/or take other action. In either of these enumerated cases, the message may be processed immediately or after some time. This flexibly in terms of when the message is processed allows, for example, possibly higher priority messages that will are received slightly later to be dispatched ahead of earlier-received messages, without sending the customer two messages at the same or nearly the same time (which could inundate the user with two much information and cause the user to focus on the less important message, disregard both messages, form negative associations with the sources of both messages, etc.). Further details of the behavior of the matching engine 110 are set forth in greater detail below.

As alluded to above, the action handler 112 receives events from the matching engine 110 for dissemination to the customer. The action handler 112 helps ensure that messages are dispatched to the customers by the most appropriate means (e.g., over the most appropriate channel). Further details of the behavior of the action handler 112 are set forth in greater detail below.

Example Implementation and Use Case

An example implementation and use case will now be provided, which together will help illustrate concepts underlying certain example embodiments. It will be appreciated that other implementations and/or use cases may be covered by the instant disclosure. In this example use case, messages are referred to as generic items of information from an organization to be distributed to one or more customers over one or more channels. These generic messages are treated as events and thus can be processed via an event-based system, a complex event processing (CEP) query, etc., as will be described in greater detail below. As noted above, there are a number of different types of messages that may be handled by the Manager 102. One possible message type that may be handled by the Manager 102 is an alert type. Alerts typically are of a relatively high priority and oftentimes are non-commercial messages that define a problem that the originating organization wishes to communicate to the customer (e.g., a weather advisory, a traffic situation, etc.). In contrast with alerts, notifications in the context of this example refer to more general messages associated with an event that the organization wishes to send to the customer. Notifications may be time sensitive, but they nonetheless may be lower priority than alerts.

The Real-Time Customer Experience Manager 102 receives messages from sources (e.g., source systems) and then (possibly) disseminates them to customers. Messages are received over interfaces that facilitate connections with the external sources, and these interfaces may be, for example, SMS, email, physical letter, and/or other computer-mediate interfaces. In a similar manner, message delivery to end-customers may be accomplished with the aid of links to external systems (e.g., via SMS, email, physical letter, and/or other interfaces). In certain example embodiments, the interface between the sources and the Manager 102 and/or between the Manager 102 and the end-customer may be more direct, e.g., with the Manager sometimes being a part of the sending organization's own systems and/or the customer's own devices. Both incoming and outgoing interfaces are electronic in nature and may involve one or more message distribution systems and/or technologies such as, for example, Message Bus technologies (e.g., JMS), direct connection (e.g., TCP streams), etc. In a nutshell, the Manager 102 may receive messages from and disseminate message to a variety of different systems, and outgoing messages may be sent over the same or different system types as those through which they were received.

Example Rating Engine

Figure 2:
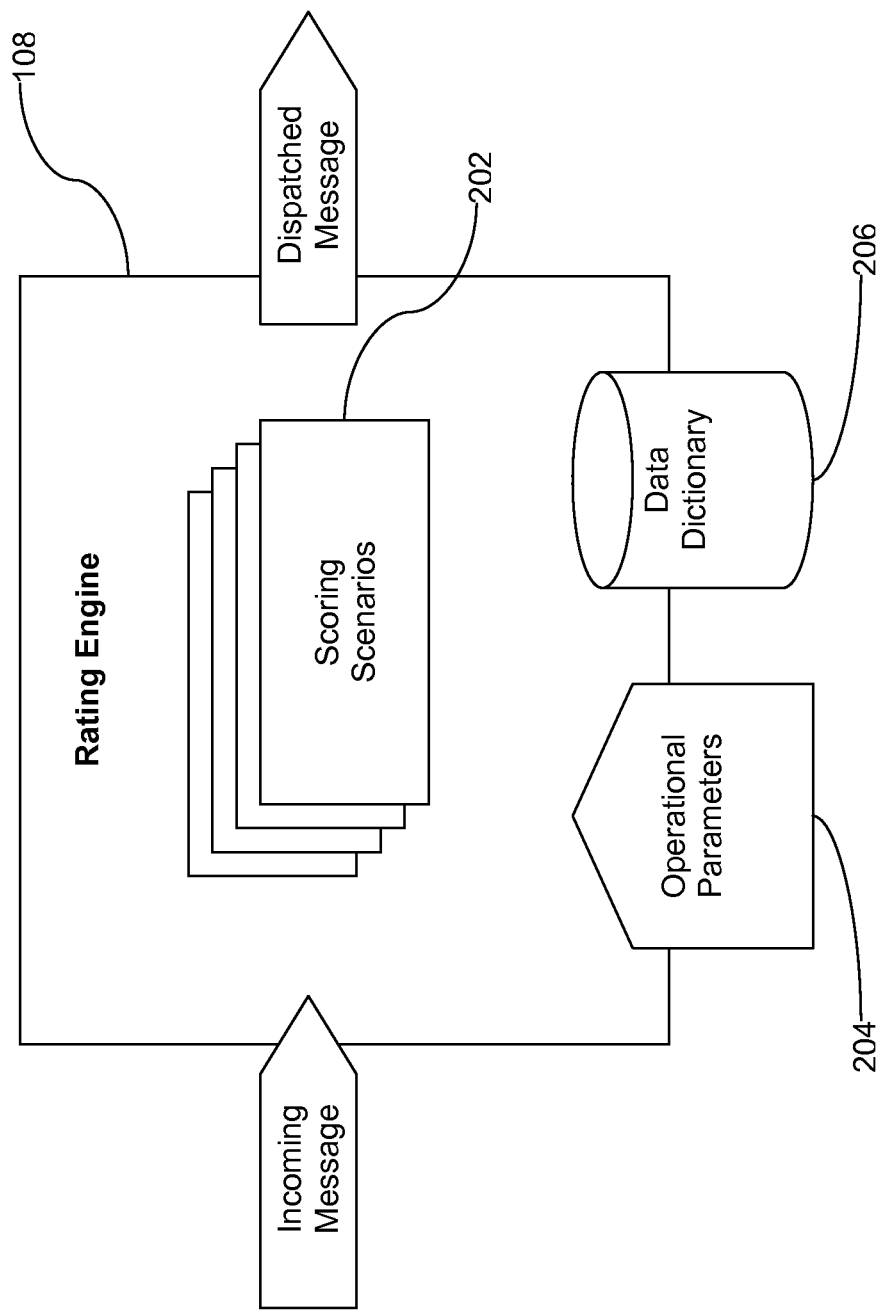
FIG. 2 is an example rating engine in accordance with certain example embodiments.

FIG. 2 is an example rating engine 108 in accordance with certain example embodiments. As noted above, the rating engine 108 normalizes incoming messages by developing metadata that may be associated with, or added to, those messages. The metadata attributes are defined in connection with a set of scoring scenarios 202. The scoring scenarios 202, which are customizable units of logic that define the correct set of metadata to be added to an incoming message, may work in connection with a set of operational parameters 204 and a data dictionary 206. A set of operational parameters 204 optionally allows some of the aspects of the scoring scenarios to be externalized, as explained in greater detail below. A data dictionary 206 includes predefined attributes that can be assigned to messages.

With respect to the latter, the data dictionary 206 may be thought of as an extensible information repository that holds both reference data (e.g., length of timeouts) and an inference network (e.g., a given city is within a given country). This information repository can be consulted to improve the accuracy of the generated metadata. In certain example embodiments, the data dictionary 206 may be an acyclic graph of attributes that each can have a value. The data in the data dictionary 206 may be maintained within a traditional database system (e.g., a relational database or the like), backed by a database management system (including a computer, computer processor, associated non-transitory memory string the content of the database that can be queried using SQL or the like, etc.). The data dictionary 206 may be used to map properties to values, and may be used to abstract over different values; it can also cover a range of types in certain example embodiments. For example, it can cover time with discrete mappings as leaves indicating that breakfast is from 07:30-08:30; lunch is from 11:55-14:00; and dinner is from 18:00-20:00. It also may include abstractions as nodes, e.g., indicating that eating times consist of breakfast+lunch times+dinner times. As another example, the data in the data dictionary can cover location. Discrete mappings may include latitude/longitude pairs as leaves (e.g., home is 53.22233, 1.234556; work is 53.63334, 1.345677), and abstractions as nodes (e.g., commute to work is home+work). In this sense, each of the discrete locations can describe a physical zone where the user is, and the aggregation thus may simply be a collection of these locations in a set of an arbitrary size. One example may be "CommonLocations", which can be mapped to the set: ["Home", "Work"]. A more advanced example could be defined as "Commute to Work", which would map to the set: ["Home", "Work", "Path to Work"]—where "path to work" is a set of locations along the roads that the user normally travels (and so it itself can be an abstraction over a list of location points).

Once the rating engine 108 receives a message, metadata is assigned and added using the extensible data dictionary 206. In addition to the examples above, the metadata applied may also include a Time-To-Live (TTL) property and an optimal trigger property. The TTL property may indicate how long an offer or alert is valid for, or the like. The TTL property may be specified as a time (e.g., 17:00 on Jul. 24, 2014) and/or event-based (e.g., until a customer next logs into a website, while there are still goods left in stock, etc.). The optimal trigger property may indicate when it is best to deliver the message. This may be specified as a specific time of day (e.g., 12:30 pm or "Lunchtime"), upon the occurrence of an external event (e.g., when sentiment of a given source is positive), when at a given location (e.g., "Home"), etc.

The rating engine 108 assigns the metadata to each incoming message by what is referred to in this example as "scoring." Scoring employs an extensible set of scoring scenarios 202 that decide on which metadata attributes should be assigned to the message. Each of the scoring scenarios 202 can be considered as a prioritized list of rules, where rules with greater priorities will override the actions of rules with lower priorities. Each of the scoring scenarios 202 has access to the original message with exiting metadata (e.g., message type/source, target destination, when received, etc.). The existing metadata may also include the originating system's requested prioritization. It also may have access to the data dictionary 206.

Each of the scoring scenarios 202 may use the logic defined within it to optionally associate or append further metadata to a particular message. Example scoring scenarios are set forth in the pseudo-code segments below, with the comments therein providing high-level descriptions of each pseudo-code segment:

```
// make all real time offers of medium priority
If
    Message.Type = "Real Time Marketing"
Then
    Priority = Medium
// make all urgent fraud messages "immediate" delivery
If
    Message.Origin = "Fraud Alert" and
    Message.Level = "Urgent"
Then
    Priority = Immediate
// delete all un-dispatched "Upsell" messages after 24 hours
If
    Message.Type = "Upsell"
Then
    TimeToLive = 1 DAY
// trigger all "in store" originated messages within a week and only
// when the Customer is in store
If
    Message.Origin = "Instore"
Then
    TimeToLive = 7 DAYs
    TriggerLocation = ALL_STORES
```

Each of the scoring scenarios 202 can also externalize certain operational parameters to allow for simple "on-the-fly" manipulation of the rating engine's behavior. For example, rather than use a fixed value of 7 days, it is possible to make this value changeable via an operational GUI, through which authorized users can change the parameter in real-time without having to modify the relevant scoring scenario itself. Operational parameters 204 thus may be stored in a non-transitory computer readable storage medium, and they may be associated with one or more scoring scenarios 202, as appropriate.

An example scoring scenario with an operational parameter fixed therein is as follows:

```
// delete all un-dispatched "Upsell" messages after 24 hours
If
    Message.Type = "Upsell"
Then
    TimeToLive = 1 DAY
```

An example scoring scenario with an operational parameter modifiable, e.g., using an external GUI is as follows:

```
// delete all un-dispatched "Upsell" message after an externally
// specified time
If
    Message.Type = "Upsell"
Then
    TimeToLive = PARAMETERS.TimeToLive
```

The scoring scenarios may be stored to and executed by a processor of the rating engine 108. An organization might cooperate by providing information about the existing metadata of a message, and an organization might even suggest a scoring scenario for its message types. However, there are situations where it would be desirable to prevent organizations from defining the scoring scenarios themselves, e.g., to ensure that they are not unfairly favoring their own messages, etc.

Once scored, messages are now normalized and may be passed on to the matching engine 110. This normalized approach afforded by the rating engine 108 allows the matching engine 110 to deal with all sources in a uniform way and for new sources of messages to be added into the system more seamlessly.

Example Matching Engine

The matching engine 110 of certain example embodiments helps continually decide which of the pending messages (e.g., those messages that have been rated by the rating engine 108 but that have not been allowed to be dispatched to the customer) received from the rating engine 108 should be sent to the customer. The matching engine 110 may be based on a real-time event-based system such as, for example, a CEP system. This approach advantageously allows for large-scale triggering and matching of pending messages with other forms of activity, including customer and/or other activities as appropriate, e.g., based on streams of incoming messages that are treated as events and therefore can be continuously queried using CEP-related techniques. By contrast, traditional database systems typically involve data being loaded and then periodically queried from within the database, which can be difficult to implement in time-critical real-time systems, e.g., because the time to load, index, and query the data is oftentimes much longer than the time validity of the message in question. CEP technology, on the other had, focuses on high-volumes of frequently changing information and has the capability to respond to data changes quickly enough to support real-time and time-critical applications. Moreover, CEP systems are also designed to cope with continually changing scenarios, allowing applications to flexibly be modified autonomously and/or by end-users. These capabilities of CEP systems allow the implementation of a flexible and effective matching engine 108 in certain example embodiments.

Figure 3:
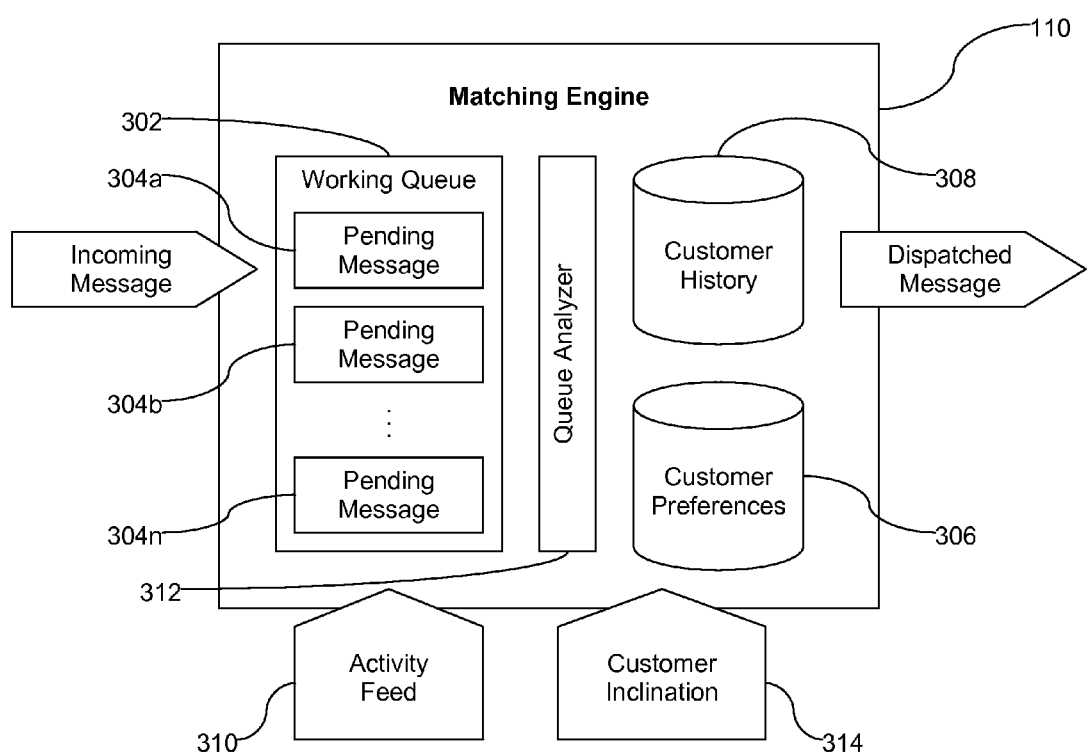
FIG. 3 is an example matching engine in accordance with certain example embodiments.

FIG. 3 is an example matching engine 110 in accordance with certain example embodiments. As shown in FIG. 3, the matching engine includes a working queue 302 of pending messages 304a-304n that are in contention to be dispatched to a customer. The working queue 302 may be thought of as a priority-ordered list of pending messages for any one customer. Thus, a Manager 102 that serves many customers may include many instances of the working queue 302, e.g., for different respective customers. It also will be appreciated that the pending messages 304a-304n may be reordered, e.g., as new messages stream in, as conditions change, etc. Further examples are provided below.

One or more persistent stores also is/are provided for storing in a non-transitory computer readable medium customer-related information. In the FIG. 3 example, there are two such stores. The first store is a customer preference store 306 that includes customer profile data (such as, for example, name, address, age, and/or other aspects), which may be received from a Customer Relationship Management (CRM) profile provided by one or more organizations and/or as supplemented by the user more directly. A second store is a customer history store 308, which includes recent activity information (e.g., last known location, website activity, etc.), a listing of recent messages that have already been dispatched and when such messages have bee dispatched, etc. An activity feed 310 may be a stream of activities for the user received over an event bus or the like. The activity feed 310 may include activities indicating, for example, location, social media use, website browsing, etc.

A queue analyzer 312 may continually analyze the working queue 302, e.g., to determine when each event should be "executed" in some way. This may include passing the message on to the action handler 112 for delivery to the customer, killing the message and removing it from the working queue 302 (e.g., when the associated message's "Time-To-Live" property is exceeded), etc. The queue analyzer 312 may run continuous queries under the control of a CEP system (including, for example, at least one processor configured to execute the continuous queries as against the pending messages, with input from the customer preferences store 306, the customer history store 308, the activity feed 310, etc.).

A "customer inclination" feed 314 describes how appropriate it is to send a given message to the customer "right now." Unlike some of the other decision points described herein which may consider the message (type, etc.) and history, the customer inclination feed 314 may be a source of data directly from the customer him/herself. The customer inclination feed 314 may be sourced from a device such as, for example, an app running within the customer's smart phone, via SMS messages from the customer, web form submissions that a user provides for providing status updates, etc. This mechanism may determine how appropriate it is (e.g., on a liner scale and defined in the value "Inclination Value" that ranges from 0% (definitely do not send a message) to 100% (where any type of message is valid and should be sent)) to send a message to a customer "right now." The calculation may be based on the status and history of a number of different sensors that any available device or smart phone app may have access to, e.g., through passive and/or active sensing approaches.

In passive sensing, a smart phone app or similar device may have access to sensors and therefore may automatically determine whether "now" is a good time to send a message. Sensors on smart phones can vary, but they may be able to provide information regarding location, acceleration (and thus general movement), light sensors, microphones, application usage (e.g., browser or phone-in-use), etc. An app may use a number of scenarios to "score" whether it believes it is a good time to send a message though. In certain example embodiments, such scoring scenarios may be built into the app and can as complex or simple as required, thereby advantageously allowing for more distributed processing in some situations. Alternatively, or in addition, such scenarios may be provided at the Manager 102 for more centralized processing and potential easier administration (e.g., in the event that scoring scenarios are added, changed, and/or deleted). Example scenarios for passive sending are provided in the pseudo-code segments below.

```
// Do not disturb the customer if they are busy
IF <ANY Application>    // (e.g., web browser, telephone)
IS in_active_use        // (user continually interacting with device)
FOR > than 1 minute
THEN Return an InclinationValue of 10%
// If the customer is not using their phone and it is likely in
// their pocket while they work, then they probable can be disturbed
IF NO <on screen activity >   // (not using app or phone; on desktop)
FOR > than 2 minutes
AND Light_Sensor < 10%
AND Vibration > medium
THEN Return an InclinationValue of 75%
// If the customer's phone is probably lying still on their desk,
// then the customer may not see the message
IF NO <on screen activity >   // (not using app or phone; on desktop)
```

```
FOR > than 5 minutes
AND Vibration = none
AND Speed = 0
THEN Return an InclinationValue of 30%
```

In active sensing, a customer may more actively state a desire for privacy. A privacy option may be implemented in accordance with following illustrative approach (although it will be appreciated that other implementations are of course possible and contemplated herein). A customer may manually press a "Request Privacy" or "Do Not Disturb" button within the app on their phone. When this is done, the Inclination Value is modified. The Inclination Value may be implemented as a multiplier in a range that begins with 0.0 and ends with 1.0. This may be used to help ensure that as soon as the customer has pressed the button, no messages are sent—but as time passes, the effect will decrease. Rather than discretely flipping from 0.0 to 1.0, the multiplier may follow a fixed envelope that can be manually configured by the organization or the user as it is implemented within the smart phone app. The points may include:

- Time A (0 seconds after button pressed): Inclination Value Modifier=0.0 and remains so until Time B;
- Time B (5 minutes after button pressed): Inclination Value Modifier=0.0 but increases linearly up until time C, where it will become 1.0; and
- Time C (20 minutes after button pressed): Inclination Value Modifier=1.0.

This means that the customer will not receive any messages for 5 minutes (or whatever time is set) but, after that, the chance of a message being received increases linearly for the next 15 minutes, after which the original pressing of the "Request Privacy" button may no longer be in effect. The app may display the statuses accordingly, e.g., so as to indicate to the user that it might be time to press the "Request Privacy" button, cue them to expect messages to begin streaming in, etc.

As alluded to above, other set times, linear and/or non-linear adjustments, etc., may be made to the customer inclination value, in different example embodiments. It also will be appreciated from the above that the customer inclination value is a combination of both the passively sourced customer inclination and the actively set customer inclination modifier. In certain example embodiments, the modifier may simply be multiplied by the current customer inclination value to determine the correct return value. Where more than one customer inclination value is determined (e.g., there is more than one scenario trigger), then the app can imply a priority of the rating scenarios, e.g., by taking the minimum, maximum, average, and/or other value, depending on how aggressive it prefers to be in the context of sending notifications. For instance, an organization that wants to ensure as many messages as possible are sent may use the maximum value, whereas a more balanced organization may select the average.

By leveraging the architectural benefits of CEP technology, it is possible for certain example embodiments to support massive scalability in terms of message throughout, message types, origins, end-customers, high-volumes of activity feed updates (e.g., a possible location update every 10 seconds for all customers of an organization with 24 million subscribers), etc. It also becomes possible for certain example embodiments to be flexible in terms of the ability to modify core behavior of the query analyzer 312, e.g., by adding, removing, and/or changing different types of scenarios, by being able to adapt to new types of messages and activities on-the-fly, etc.

Exemplary behavior of the queue analyzer 312 is set forth below. In the meantime, it is noted that the queue analyzer 312 may make use of triggering criteria, which describes how the queue analyzer 312 will interrogate the pending messages 304a-304n in the working queue 302 to determine whether they are to be sent. Triggering criteria may be developed at an appropriate time such as, for example, upon receipt of a new pending message, an update from the activity feed 310 (e.g., a new location for a customer), an internal timer update (e.g., system clock reaches a predefined time or time increment), etc. These scenarios collectively help define the combined behavior of the matching engine 110, and each is described in greater detail below. After one of these scenarios occurs, the queue analyzer 312 may review the working queue 302 to decide on an action to take, which may be one of the following and/or other actions: take no action; dispatch one or more pending messages, delete a pending message and remove it from the working queue 302, etc.

Figure 4:
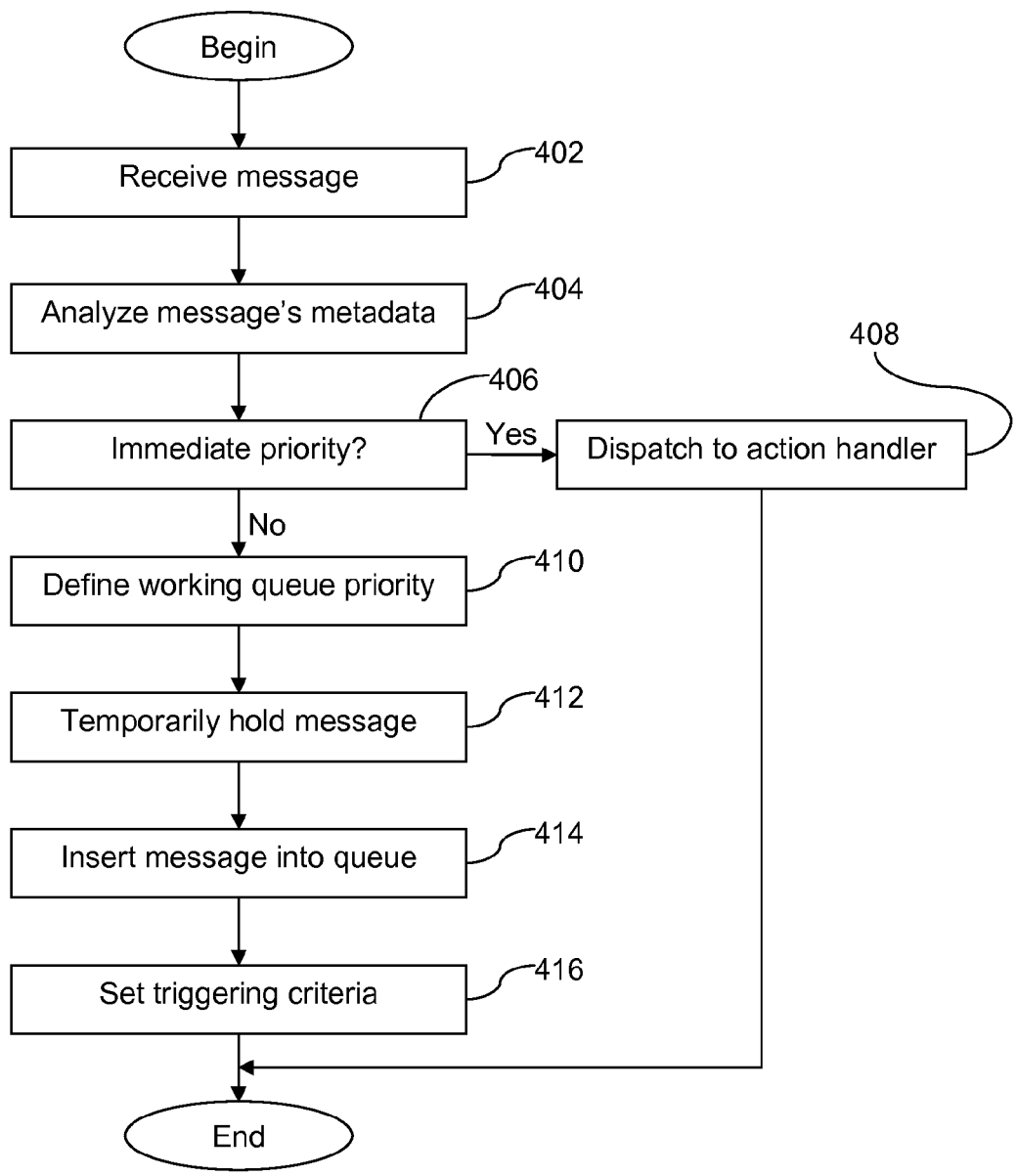
FIG. 4 is a flowchart showing certain actions that may be taken when a new pending message is received by the example matching engine of FIG. 3, in accordance with certain example embodiments.

With respect to the receipt of a new pending message, the following actions, which are described in connection with the FIG. 4 example flowchart, may be taken. When a new message is received (step 402), its associated set of metadata is analyzed (step 404). The set of metadata will likely be different for different pending messages and message types. It also may differ as scoring scenarios 202 within the rating engine 108 are changed, as the possible set of data within the data dictionary 206 is extended and/or edited, etc.

A check may be performed on a new pending message to determine whether it should bypass the working queue 302, entirely (step 406). This check may take into account cases where the priority is "immediate" (and that presumably will be rare). If so, then the message is dispatched to the action handler 112 (step 408). If there is no bypass, an algorithm may be used to determine the location within the working queue 302 where the message should be stored and to determine the appropriate triggering criteria for the message. In certain example embodiments, the triggering criteria may be implemented as a list of data and/or metadata attributes and values that any given message must adhere to before it can be dispatched to a customers.

A normalized "working queue priority" for each new message is defined (step 410). This priority may take into account the message's priority (e.g., as initially set by the sender), its Time-To-Live, the originating source, and/or other properties. More particularly, in certain example embodiments, the working queue priority may be implemented so as to include a priority selected from a predefined list of priorities (e.g., as defined in the data dictionary 206), a weighting factor based on the Time-To-Live value (e.g., where a shorter Time-To-Live value results in a higher priority), and a representation of the originating source as being from a predefined prioritized list (e.g., such that Fraud Alerts are prioritized as level 1, real-time marketing campaigns are prioritized as level 5, Postal Offers are prioritized as Level 10, etc., where lower numbers represent higher priorities). Certain example embodiments may further take into account message types apart from originating sources, e.g., as some organizations may send differing priority messages (e.g., the National Weather Service's storm warnings may have a higher priority than storm advisories, and both warnings and advisories may have higher priorities than public service announcements regarding high pollen levels).

Non-immediate messages may be held within the working queue 302 for a short period (step 412) so that higher priority messages that are received a short time after non-immediate messages are received are not missed, e.g., as the non-immediate messages are being processed. In certain example embodiments, the queue analyzer 312 may use a time-based function to judge the shortest amount time that a pending message can be held before dispatching it to the action handler 112 (assuming no other higher priority messages exist). This may be done using a calculated timestamp that is included with the metadata of the pending message. This "minimum time timestamp" may be regarded as the minimum amount of time that a message should be held within the working queue 302, thereby allowing for later, though higher priority messages to be preferentially dispatched (or at least in preference to this lower-priority message that is being held). In certain example embodiments, the minimum time timestamp may be calculated as a function of message origin and message type. Fixed time values for each may be retrieved from the data dictionary 206. For example, an "INSTORE" minimum time value may be 10 seconds. The calculation therefore may be represented as follows:

---

Minimum Time Timestamp := AVERAGE (MIN_TIME_LOOKUP (Message.Type), MIN_TIME_LOOKUP (Message.Origin)) * (Message.Priority)

---

Once the normalized priority is defined, the new message is placed in its correct place within the ordered working queue 302 (step 414). The working queue 302 is ordered by this normalized working queue priority value. If there is a conflict based on the same normalized working queue priority value as between two messages, then the constituent elements of the normalized working queue priority values can be consulted in a predetermined order to try to resolve the conflict. For instance, the message's original priority, then Time-To-Live, then originating source may be checked, in this order. If there is still a conflict, then newer messages may be placed above or below the older ones, e.g., depending on the example implementation.

The defined triggering criteria of the original message may be used to "decorate" the pending message with information that defines the types of activity by which it may be dispatched (step 416). For instance, this information may be attached to or otherwise associated with the message. The types of criteria may include, for example, location information, online activity (e.g., website usage), time, associated message (for inter-message correlation (e.g., do not send this message unless a related message of this type has already been dispatched), etc. These decorations may assist the queue analyzer 312 in determining when to investigate which messages for possible dispatch.

With respect to the receipt of an update from the activity feed 310, an extensible set of (external) inputs is made available to the queue analyzer 312. These events may include, for example:

Location updates for monitored entities (normally the end-customers) may be sourced from smart phone apps, location of social media interactions (e.g., Tweets, check-ins, or the like), etc.).

Interactions with social media and analytics over such interactions. This may include discrete interactions (e.g., customer Tweets, comments on the organization's Facebook page, etc.), analytics (e.g., positive or negative sentiment of the Tweets related to this organization, thumbs up/down, like or not, etc.), etc.

Web-Site activity such as, for example, the interactions that the customer has with the organization's web pages, smart phone apps, etc.

In-store activity (e.g., where the customer interacts with staff or devices in one of the organization's stores, etc.).

With respect to an internal timer update, it is noted that the majority of messages are expected to have some time sensitivity to them, even if it is over a period of weeks. Indeed, it is expected that many messages will have a time sensitivity on the order of seconds or minutes. Continual messages from a system timer therefore may cause the queue analyzer 312 to interrogate the working queue 302.

Further detail concerning the behavior of the example queue analyzer 312 will now be provided. When in receipt of an update from any of the above-descried and/or other sources, the queue analyzer 312 will interpret the pending messages within the working queue 302 to identify whether to trigger the dispatching of any of these pending messages, whether to trigger the deletion of one or more pending message, etc. It would be desirable in certain example implementations to have the queue analyzer 312 respond to changes within the working queue 302 (or the timers) within milliseconds. With respect to timers, certain example embodiments involve the working queue working in an "event-driven" manner, in that its state is changed when some event occurs to cause some calculation to happen (and the working queue to proceed in some way). If no event occurs, then no processing happens, in such example embodiments. The example here involves the execution of some processing because of the change in the working queue itself (and this is the event that causes the processing to occur)—but it will be appreciated that the processing also could be triggered by a timer. The use of CEP technology in implementing the matching engine 110 therefore can be advantageous.

Figure 5:
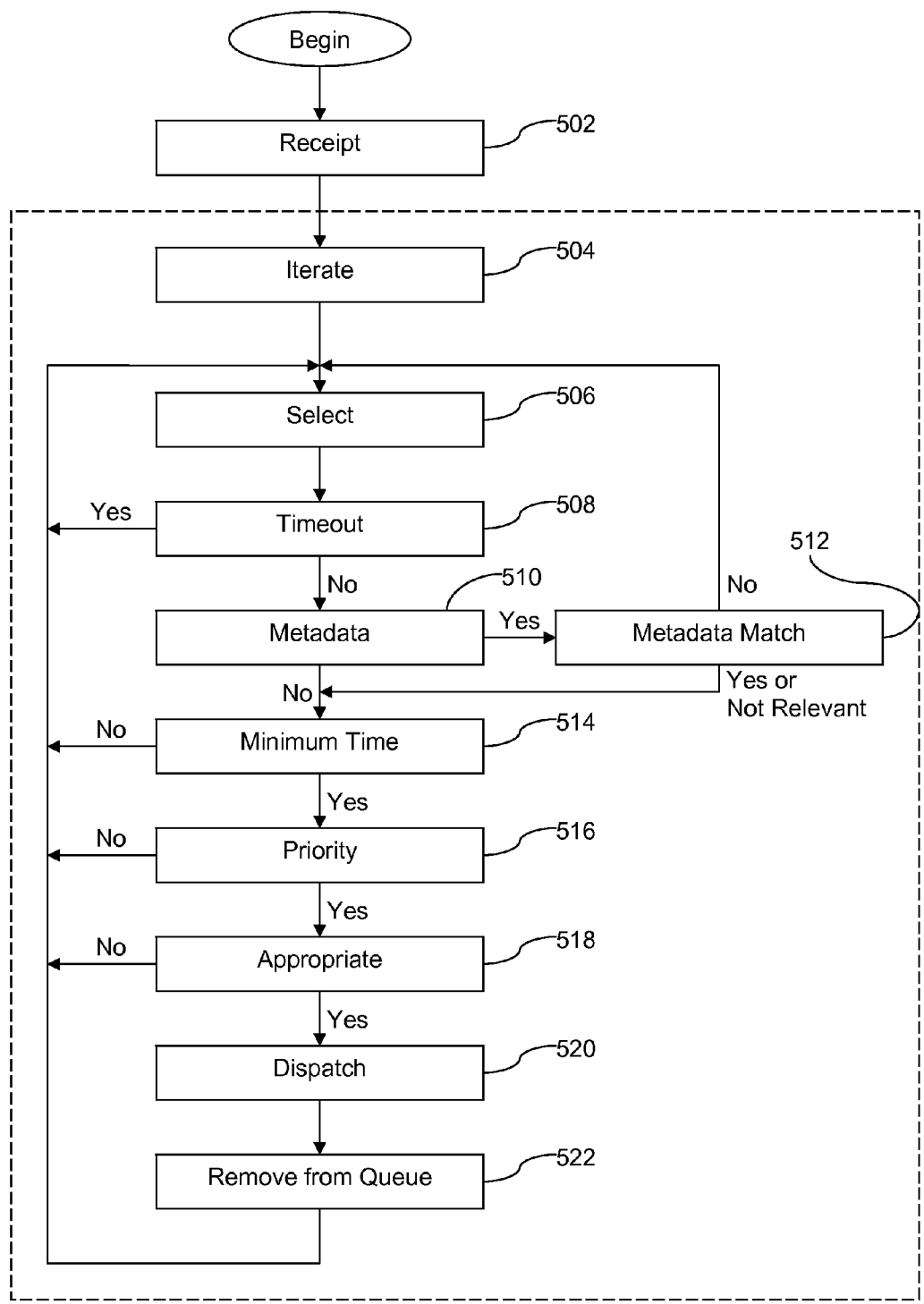
FIG. 5 is a flowchart showing one example of how the queue analyzer of the example matching engine of FIG. 3 may operate, in accordance with certain example embodiments.

FIG. 5 is a flowchart showing one example of how the queue analyzer 312 of the example matching engine of FIG. 3 may operate, in accordance with certain example embodiments. As shown in FIG. 5, an update (from any source, including timers) is received (step 502). An iterative process begins (step 504), e.g., as the pending messages within the working queue 302 for each customer are traversed in priority order (e.g., with highest priority messages being traversed first). A selection process is performed in order to help identify whether any pending messages are to be dispatched (step 506). A timeout check is made as to determine whether the message has exceeded its Time-To-Live value (step 508). If so, this pending message is deleted and removed from the working queue 302.

A first metadata check is performed (step 510) to determine whether there is metadata associated with the message. If so, a second metadata check is performed (step 512) to determine whether there is a match between the metadata within the update and the metadata associated with the pending message. As indicated above, the data dictionary 206 may be used to normalize both the attributes and the values within the metadata. For instance, if the update has a specific city name within it, but the pending message has a country name within it, then the data dictionary 206 can map the city name to a country name such that comparisons can be made by the queue analyzer 312. If there is an explicit non-match between the attribute types and the attribute values (e.g., a customer's location matches a target area; the current time is within the defined "lunch time"; etc.), then this pending message is skipped.

A minimum time check is performed (step 514) to determine whether the pending message has been in the working queue 302 for longer than stated its minimum time timestamp. If not, then this pending message is skipped.

A priority check is performed (step 516) to determine whether the priority of the pending message exceeds the level of priority required to dispatch the message to the action handler 112. This calculation may, for example, compare the priority of the pending message to a calculation that takes into account the number of messages recently dispatched to the customer and the maximum number of messages that may be dispatched to each customer (if defined), e.g., based on the customer history store 308 and/or the customer preferences store 306. The calculation may in certain example embodiments help ensure that the current priority for the message is greater than the Exponentially Weighted Moving Average (EWMA) of the number of messages (and when they were dispatched) for this user, e.g., using the following test condition:

IF Message.Priority>EWMA (Customer ID)

If the priority threshold is not met, then this pending message is skipped.

An appropriateness check is performed (step 518). If there is a customer inclination value (which may be the result of passive and active values, e.g., as described above) that is relatively new (e.g., less than 5 minutes old), then this check may be used to gauge whether to send the pending message. This step can be as simple or as complex as desired. For instance, one simple implementation involves ensuring that the value is greater than a specific threshold (e.g., IF Customer_Inclination_Value>50% THEN DISPATCH), and as in the computation of the value itself, organizations can select this threshold to be as aggressive or cautious as desired. More complex checks also are possible and may consider some or all of the data values already used and/or other data values. Three additional examples in this vein are as follows:

- IF Message.Type = "Upsell" AND Customer_Inclination_Value > 70% THEN DISPATCH
- IF Message.Type = "Alert" AND Customer_Inclination_Value > 50% THEN DISPATCH
- IF Message.Type = "Urgent" AND Customer_Inclination_Value > 10% THEN DISPATCH If this appropriateness check fails, then the message is skipped.

If the above-described example and/or other checks are passed, then the message is dispatched (step 520). Once dispatched, the pending message is flushed from the working queue 402 (step 522) so that it is not dispatched twice. In cases where multiple messages of the same type are required, they may in certain example embodiments be submitted independently into the system, e.g., providing more direct control of frequency to the originating system.

Example Action Hander

Figure 6:
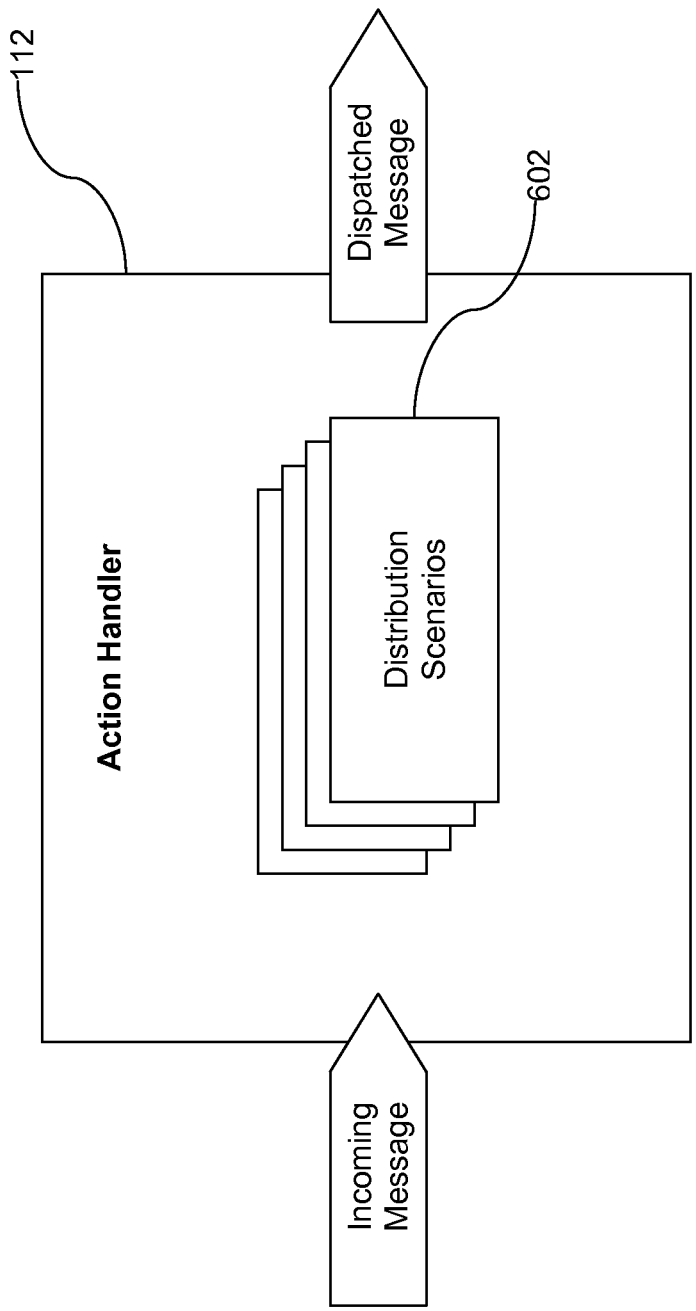
FIG. 6 is an example action handler in accordance with certain example embodiments.

As indicated above, the action handler 112 receives events from the matching engine 110 and disseminates them to the customer over the most appropriate delivery channel(s). An example action handler 112 is shown in FIG. 6. It will be appreciated from the descriptions above that certain example embodiments may function with a broad array of distribution channels. In this regard, the action handler 112 may be configurable to communicate of over common channels that may include (but are not limited to):

Email—send to the customer's email address;

SMS—send to the customer's mobile or other device via SMS;

Smart phone app—send to the customer's device, e.g., via Apple Push Notification Service (APNS) for iOS or a similar messaging service for a particular device (for instance, with the Manager 102 itself as a registered user or as the organization on its behalf), via an app provided by the organization, via another device-specific means, etc.;

Postal letter—distribute via conventional letter via postal service;

Phone call—request that the notification be manually communicated with the customer by the organization;

Website—when the customer is known to visit a company web page, display the message as website content;

In Store—next time this customer visits a physical store and whose presence is known (e.g., when visiting a cashier in a bank, using a customer loyalty card, etc.), then provide, mention, print, or otherwise deliver the message; and/or Business Process—invoke a business process to disseminate the message.

A set of distribution scenarios 602 may help assign the correct distribution channel(s) to each event to be executed (e.g., for each message to be sent). Each distribution scenario may be regarded as a customizable piece of logic that defines the correct distribution channel for a specific message. That is, the distribution scenarios 602 may be extensible sets of scenarios that can analyze information associated with the message/event (e.g., the associated metadata) to decide on type of channel over which the message should be distributed. In certain example embodiments, the distribution scenarios 602 may take the form of a single column of prioritized conditional logic expressions equivalent to a single rule in the context of a rules engine. In certain example embodiments, they may be implemented using CEP technology in order to provide a similar user experience, despite a different underlying implementation. In any event, there may be a single rule within any one distribution scenario, but distribution scenarios may be more complicated in other cases. For instance, multiple rules may be provided, they may include state information, etc. This may make it possible in certain example embodiments to allow a single piece of logic to be partitioned across many rules.

A first example common distribution scenario could involve sending location-based e-commerce offers to the customer's phone, via an app of the organization or the Manager 102 if they have one, via SMS message if they do not have the app but do have a mobile phone if not, or via email if they do not have a mobile phone. The following logic may be implemented in this regard:

- IF Incoming_Message IS e-commerce_offer AND IS location-based
  THEN "PHONE = TRUE"
- IF "PHONE = TRUE" AND Customer.HasApp = TRUE
  THEN Channel = SmartPhoneAPP (Customer, Message)
- IF "PHONE = TRUE" AND Customer.HasApp = FALSE
  THEN Channel = SMS (Customer, Message)
- IF "PHONE = FALSE"
  THEN Channel = EMAIL (Customer, Message)

A second example common distribution scenario could involve telephoning VIP customers for all investment events that are not time critical. The following logic may be implemented in this regard:

IF Incoming_Message IS investment
AND Customer.VIP = TRUE
THEN Channel = Phone call (Customer, Message)

The distribution scenarios 602 may be ordered manually (e.g., in priority order) and only the first matching distributions scenario may be executed for any one received incoming message. The other (e.g., lower priority) distribution scenarios 602 may be ignored and not processed.

Although certain example embodiments have been described in connection with organizations, it will be appreciated that that term is being used generically to identify the source and/or source system of a message. Thus, an organization might be a private company, non-profit group, government branch, non-governmental organization (NGO), etc. Customers may in certain example instances be message originators. Similarly, although certain example embodiments have been described in connection with customers, it will be appreciated that that term is being used generically to identify end-user receivers of messages. Thus, customers may be individuals, groups of individuals, associations, companies, email reflectors, etc. Organizations may in certain example instances be message receivers.

It will be appreciated that the example processes/methods described above (including those shown in the example flowcharts) may be performed in any suitable order. Similarly, it will be appreciated that the example steps therein may be combined or separated into different numbers of steps, e.g., to perform the same or similar functionality as that shown and described herein.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-mediated electronic message distribution method, comprising:
   receiving electronic messages from a plurality of different source systems, each said received message having an associated message type;
   dynamically and programmatically developing metadata for each said received message based on an extensible set of scoring scenarios, the metadata including at least one metric that is comparable across messages of different message types in assessing relative priorities of such messages, the extensible set of scoring scenarios being stored to a first non-transitory computer readable storage medium and being computer-executable;

determining where in a queue of pending messages each said received message is to be inserted, based on the metadata associated with the respective messages;

responsive to and based on the determining, inserting each said received message into the queue of pending messages;

executing, in connection with at least one processor, a complex event processing (CEP) query on the queue of pending messages, including the at least one inserted message based on the determination, to dynamically identify a pending message therein that is to be delivered;

subjecting the identified pending message that is to be delivered to a plurality of pre-programmed distribution scenarios to identify which of a plurality of possible communication channels that identified pending message is to be sent, the pre-programmed distribution scenarios being stored to a second non-transitory computer readable storage medium and being computer-executable; and forwarding on the identified pending message to the identified communication channel(s) for sending.

2. The method of claim 1, wherein each said scoring scenario includes a prioritized list of rules, implemented as program logic, in which rules with higher relative priorities override rules with lower relative priorities, the scoring scenarios specifying what metadata is to be developed for each received message.

3. The method of claim 2, wherein each said scoring scenario is programmable to consider and operate on original metadata that accompanies received messages, the original metadata specifying a message type, message source, target destination, requested prioritization, time-to-live value, and/or proposed trigger, associated with each received message.

4. The method of claim 2, wherein each said scoring scenario is programmable to consider and operate on one or more operational parameters stored external to the associated prioritized list of rules that define the scoring scenarios.

5. The method of claim 1, further comprising deriving at least some of the metadata from a data dictionary that is separate from the extensible set of scoring scenarios, the data dictionary including mappings between properties and values, as well as abstractions over at least some different values.

6. The method of claim 5, wherein the deriving comprises making inferences about original metadata that accompanies received messages based on lookups to the data dictionary.

7. The method of claim 1, wherein the CEP query, in dynamically identifying the pending message that is to be delivered, takes into account pre-stored customer preferences and/or customer history information, the customer history information indicating recent activity information for at least one identified customer and recently sent messages for the at least one identified customer.

8. The method of claim 1, wherein the CEP query, in dynamically identifying the pending message that is to be delivered, takes into account a feed of activities being undertaken by at least one customer to whom messages are being sent.

9. The method of claim 8, wherein the CEP query, in dynamically identifying the pending message that is to be delivered, takes into account a customer inclination feed indicative of how appropriate it is to send a message to the at least one customer at a current time, the customer inclination feed incorporating actively and/or passively sensed data directly from the at least one customer.

10. The method of claim 9, wherein the customer inclination feed is expressed as a numerical value along a linear scale.

11. The method of claim 1, wherein the CEP query, in dynamically identifying the pending message that is to be delivered, takes into account pre-stored customer profile and history information, if known; a feed of activities being undertaken by at least one customer to whom messages are being sent; and a customer inclination feed indicative of how appropriate it is to send a message to the at least one customer at a current time.

12. The method of claim 1, wherein the determining of where in the queue of pending messages each said received message is to be inserted comprises generating a normalized numerical value for each said received message as a function of attributes of the associated metadata, the attributes including priority, message time-to-live, and source system.

13. The method of claim 12, wherein the priority attribute is selected from a first predefined list of priorities, the message time-to-live attribute is used as a weighting factor such that shorter message time-to-live attribute values result in higher priorities than longer message time-to-live attribute values, and the source system attribute is selected from a second predefined list of priorities.

14. The method of claim 1, wherein the CEP query is executed each time: a new message is received, an activity feed update is received, and an internal timer event is triggered.

15. The method of claim 1, further comprising ensuring that received messages are held within the queue for at least a predetermined minimum amount of time; unless a given received message is to be sent immediately, in which case the message bypasses the queue and is forwarded on for sending.

16. The method of claim 1, wherein a given message is received from an organization over a first channel and is to be sent to a customer over a second channel, the first and second channels being different from one another.

17. The method of claim 1, wherein the messages are received from a plurality of different organizations and are directed to a plurality of different individuals.

18. A message manager computer system, comprising:
processing resources including at least one processor; and
a plurality of computer-mediated interfaces to respective electronic message source systems over which electronic messages are receivable;
wherein the processing resources are configured to cooperate with the plurality of interfaces and control the message manager computer system to at least:
receive electronic messages from ones of the electronic message source systems, each said received message having an associated message type;
dynamically and programmatically develop metadata for each said received message based on an extensible set of scoring scenarios, the metadata including at least one metric that is comparable across messages of different message types in assessing relative priorities of such messages, the extensible set of scoring scenarios being stored to a first non-transitory computer readable storage medium of the message manager computer system and being computer-executable;

determine where in a queue of pending messages each said received message is to be inserted, based on the metadata associated with the respective messages;

responsive to and based on the determining, insert each said received message into the queue of pending messages;

dynamically identify a pending message in the queue of pending messages, including the at least one inserted message based on the determination, that is to be delivered;

subject the identified pending message that is to be delivered to a plurality of pre-programmed distribution scenarios to identify which of a plurality of possible communication channels that identified pending message is to be sent, the pre-programmed distribution scenarios being stored to a second non-transitory computer readable storage medium of the message manager computer system and being computer-executable; and forward on the identified pending message to the identified communication channel(s) for sending.

19. The system of claim 18, wherein the processing resources are further configured to control the message manager computer system to at least dynamically re-order the pending messages in the queue of pending messages upon the occurrence of predefined events.

20. The system of claim 19, wherein the predefined events correspond to activities including a new message being received and an activity feed of user activities being updated.

21. The system of claim 18, wherein the processing resources are further configured to control the message manager computer system to at least execute a query on the queue of pending messages to dynamically identify a pending message therein that is to be delivered.

22. The system of claim 21, wherein the query is a complex event processing (CEP) query.

23. The system of claim 22, wherein the CEP query, in dynamically identifying the pending message that is to be delivered, is programmed to take into account: (a) pre-stored customer preferences and/or customer history information, the customer history information indicating recent activity information for at least one identified customer and recently sent messages for the at least one identified customer; (b) a feed of activities being undertaken by at least one customer to whom messages are being sent; and/or (c) a customer inclination feed indicative of how appropriate it is to send a message to the at least one customer at a current time, the customer inclination feed incorporating actively and/or passively sensed data directly from the at least one customer.

24. The system of claim 22, wherein the CEP query is executed each time: a new message is received, an activity feed update is received, and an internal timer event is triggered.

25. The system of claim 18, wherein each said scoring scenario includes a prioritized list of rules, implemented as program logic, in which rules with higher relative priorities override rules with lower relative priorities, the scoring scenarios specifying what metadata is to be developed for each received message.

26. The system of claim 25, wherein each said scoring scenario is programmable to consider and operate on original metadata that accompanies received messages, the original metadata specifying a message type, message source, target destination, requested prioritization, time-to-live value, and/or proposed trigger, associated with each received message.

27. The system of claim 18, further comprising a data dictionary that is separate from the extensible set of scoring scenarios, and wherein the processing resources are further configured to control the message manager computer system to derive at least some of the metadata from the data dictionary based on mappings between properties and values, as well as abstractions over at least some different values, stored to the data dictionary.

28. The system of claim 18, wherein the determining of where in the queue of pending messages each said received message is to be inserted comprises generating a normalized numerical value for each said received message as a function of attributes of the associated metadata, the attributes including priority, message time-to-live, and source system.

29. The system of claim 28, wherein the priority attribute is selected from a first predefined list of priorities, the message time-to-live attribute is used as a weighting factor such that shorter message time-to-live attribute values result in higher priorities than longer message time-to-live attribute values, and the source system attribute is selected from a second predefined list of priorities.

30. A non-transitory computer readable storage medium tangibly storing a program comprising instructions that, when executed by a computer, cause the computer to at least:

receive electronic messages from a plurality of different source systems, each said received message having an associated message type;

dynamically and programmatically develop metadata for each said received message based on an extensible set of scoring scenarios, the metadata including at least one metric that is comparable across messages of different message types in assessing relative priorities of such messages;

determine where in a queue of pending messages each said received message is to be inserted, based on the metadata associated with the respective messages;

responsive to and based on the determining, insert each said received message into the queue of pending messages;

execute a query on the queue of pending messages, including the at least one inserted message based on the determination, to dynamically identify a pending message therein that is to be delivered;

subject the identified pending message that is to be delivered to a plurality of pre-programmed distribution scenarios to identify which of a plurality of possible communication channels that identified pending message is to be sent; and forward on the identified pending message to the identified communication channel(s) for sending.

* * * * *